United States Patent
Witte et al.

(10) Patent No.: US 9,657,412 B2
(45) Date of Patent: May 23, 2017

(54) METHOD FOR TREATING A MIXTURE

(71) Applicant: LIST TECHNOLOGY AG, Arisdorf (CH)

(72) Inventors: Daniel Witte, Grenzach-Wyhlen (DE); Christian Oecknick, Rheinfelden (DE)

(73) Assignee: List Technology AG, Arisdorf (CH)

( * ) Notice: Subject to any disclaimer, the term of this patent is extended or adjusted under 35 U.S.C. 154(b) by 0 days.

(21) Appl. No.: 15/028,615

(22) PCT Filed: Sep. 26, 2014

(86) PCT No.: PCT/EP2014/002607
§ 371 (c)(1),
(2) Date: Apr. 11, 2016

(87) PCT Pub. No.: WO2015/051884
PCT Pub. Date: Apr. 16, 2015

(65) Prior Publication Data
US 2016/0251776 A1    Sep. 1, 2016

(30) Foreign Application Priority Data

Oct. 10, 2013  (DE) .................. 10 2013 111 221
Aug. 15, 2014  (DE) .................. 10 2014 111 689

(51) Int. Cl.
*B29B 7/40*      (2006.01)
*D01D 1/02*      (2006.01)
(Continued)

(52) U.S. Cl.
CPC .................. *D01D 1/02* (2013.01); *B01F 7/10* (2013.01); *B01F 15/00201* (2013.01);
(Continued)

(58) Field of Classification Search
CPC ....................................................... B29B 7/402
(Continued)

(56) References Cited

U.S. PATENT DOCUMENTS 1,565,365 A * 12/1925 Hidzick ................. A22C 25/02
                                                        366/172.1
1,669,962 A *  5/1928 Wihlfahrt ............. A21C 1/1435
                                                        366/172.2
(Continued)

FOREIGN PATENT DOCUMENTS

CH          506322 A    4/1971
DE        4303852 A1    8/1994
(Continued)

OTHER PUBLICATIONS

International Search Report for PCT/EP2014/002607 dated Jan. 9, 2015.

*Primary Examiner* — David Sorkin
(74) *Attorney, Agent, or Firm* — Bachman & LaPointe, PC

(57) ABSTRACT

A method for treating a mixture in a single-shaft or multi-shaft mixer (M), especially a kneader-mixer, especially for preparing a spinning solution. A solvent or solvent mixture is added to the product over the length of a product chamber in order to reduce a viscosity of the solvent or of the mixture and to increase an evaporative capacity. The viscosity of the solution or of the mixture is determined and/or modified in predetermined locations in the product chamber.

8 Claims, 2 Drawing Sheets

(51) Int. Cl.

| | | |
|---|---|---|
| *B01F 15/04* | (2006.01) | |
| *C08B 1/00* | (2006.01) | |
| *C08L 1/02* | (2006.01) | |
| *B29B 7/72* | (2006.01) | |
| *B01F 7/10* | (2006.01) | |
| *B01F 15/00* | (2006.01) | |
| *G05D 24/02* | (2006.01) | |
| *B29B 7/44* | (2006.01) | |
| *C08B 9/00* | (2006.01) | |
| *D01F 2/00* | (2006.01) | |
| *B29K 1/00* | (2006.01) | |

(52) U.S. Cl.
CPC .. *B01F 15/00246* (2013.01); *B01F 15/00883* (2013.01); *B01F 15/0408* (2013.01); *B29B 7/402* (2013.01); *B29B 7/44* (2013.01); *B29B 7/722* (2013.01); *B29B 7/726* (2013.01); *B29B 7/728* (2013.01); *C08B 1/003* (2013.01); *C08B 9/00* (2013.01); *C08L 1/02* (2013.01); *G05D 24/02* (2013.01); *B29K 2001/00* (2013.01); *D01F 2/00* (2013.01)

(58) Field of Classification Search
USPC .............. 366/76.6, 151.1, 152.3, 172.1
See application file for complete search history.

(56) References Cited

U.S. PATENT DOCUMENTS

| | | | |
|---|---|---|---|
| 2,907,555 A * | 10/1959 | Engels | B01F 7/022 366/172.1 |
| 3,687,422 A | 8/1972 | List | |
| 5,407,266 A | 4/1995 | Dötsch et al. | |
| 7,331,703 B1 | 2/2008 | Hahn et al. | |
| 8,746,959 B2 * | 6/2014 | Bachman | A01K 5/001 366/132 |
| 2006/0193197 A1 | 8/2006 | Fleury | |

FOREIGN PATENT DOCUMENTS

| | | |
|---|---|---|
| DE | 19940521 A1 | 4/2001 |
| DE | 10160535 A1 | 6/2003 |
| DE | 102010014298 A1 | 10/2011 |
| EP | 0517068 A1 | 12/1992 |
| WO | 2014023738 A2 | 2/2014 |

\* cited by examiner

METHOD FOR TREATING A MIXTURE

BACKGROUND OF THE INVENTION

Method for treating a mixture in a single-shaft or multishaft mixer corresponding to the preamble of claim 1 and an apparatus therefor.

Methods of this kind are implemented in particular in what are called kneader-mixers. These mixers serve a great diversity of purposes. A first that may be mentioned is that of evaporation of solvent recovery, which takes place batchwise or continuously and often also under reduced pressure. By this means, for example, distillation residues and, in particular, toluene diisocyanates are treated, but also production residues with toxic or high-boiling solvents from chemistry and from drug production, detergent solutions and paint slurries, polymer solutions, elastomer solutions from solution polymerization, adhesives, and sealants.

With the equipment, furthermore, continuous or batchwise contact drying, of water-moist and/or solvent-moist products, is carried out, often likewise under reduced pressure. The application is intended in particular for pigments, dyes, fine chemicals, additives, such as salts, oxides, hydroxides, antioxidants, temperature-sensitive pharmaceutical and vitamin products, active ingredients, polymers, synthetic rubbers, polymer suspensions, latexes, hydrogels, waxes, pesticides, and residues from chemical or pharmaceutical production, such as salts, catalysts, slags, and waste liquors. These methods also find application in food production, as for example in the production and/or treatment of sweetened condensed milk, sugar replacers, starch derivatives, alginates, for the treatment of industrial sludges, oil sludges, biosludges, paper sludges, paint sludges, and generally for the treatment of sticky, crust-forming products of paste-like viscosity, waste products, and cellulose derivatives.

In kneader-mixers, degassing and/or devolatilizing may take place. This operation is applied to polymer melts, after condensation of polyester or polyamide melts, to spinning solutions for synthetic fibers, and to polymer or elastomer pellets or powders in the solid state.

In a kneader-mixer, a polycondensation reaction can take place, usually continuously and usually in the melt, and is used in particular in the treatment of polyamides, polyesters, polyacetates, polyimides, thermoplastics, elastomers, silicones, urea resins, phenolic resins, detergents, and fertilizers.

An addition polymerization reaction may also take place, usually likewise continuously. This is applied to polyacrylates, hydrogels, polyols, thermoplastic polymers, elastomers, syndiotactic polystyrene, and polyacrylamides.

Very generally, solid, liquid, and multiphase reactions can take place in the kneader-mixer. This is especially true of baking reactions, in the treatment of hydrofluoric acid, stearates, cyanates, polyphosphates, cyanuric acids, cellulose derivatives, cellulose esters, cellulose ethers, polyacetal resins, sulfanilic acids, Cu phthalocyanines, starch derivatives, ammonium polyphosphates, sulfonates, pesticides, and fertilizers.

In addition, reactions can take place in solid/gaseous states (e.g., carboxylation) or in liquid/gaseous states. This is applied in the treatment of acetates, acids, Kolbe-Schmitt reactions, e.g., BON, Na salicylates, parahydroxybenzoates, and pharmaceutical products.

Liquid/liquid reactions take place in the case of neutralization reactions and transesterification reactions.

Dissolving and/or degassing in kneader-mixers of this kind takes place in the case of spinning solutions for synthetic fibers, polyamides, polyesters, and celluloses.

An operation known as flushing takes place in the treatment and/or production of pigments.

A solid-state postcondensation takes place in the production and/or treatment of polyester and polyamides; continuous pulping takes place, for example, in the treatment of fibers, e.g., cellulose fibers, with solvents; crystallization from the melt or from solutions takes place in the treatment of salts, fine chemicals, polyols, alkoxides; compounding, mixing (continuous and/or batchwise) take place in the case of polymer mixtures, silicone compositions, sealants, fly ash; coagulation (especially continuous) takes place in the treatment of polymer suspensions.

In a kneader-mixer it is also possible for multifunctional operations to be combined, examples being heating, drying, melting, crystallizing, mixing, degassing, reacting—all continuously or batchwise. Such operations are used to produce and/or treat polymers, elastomers, inorganic products, residues, pharmaceutical products, food products, printing inks.

Other possible operations taking place in kneader-mixers include vacuum sublimation/desublimation, as used to purify chemical precursors, e.g., anthraquinone, metal chlorides, organometallic compounds, etc. Furthermore, pharmaceutical intermediates can be produced.

Continuous carrier-gas desublimation, for example, takes place in the case of organic intermediates, e.g., anthraquinone and fine chemicals.

A kneader-mixer has a continuous gas and product chamber which extends from an intake to a discharge. This differentiates a kneader-mixer essentially from an extruder, where there is no continuous gas chamber between intake and discharge. The continuous gas chamber in the case of the kneader-mixer comes about from the fact that the kneader-mixer is arranged horizontally and is only partly filled with product. Above the product there is a free gas space in which evaporated solvent or the like accumulates.

Single-shaft and double-shaft kneader-mixers differ substantially. A single-shaft kneader-mixer with its shaft disposed horizontally is described in EP 91 405 497.1, for example. Its key characteristic is the presence on the shaft of kneading elements which interact with counter elements that extend radially from an inner housing wall toward the shaft. Usually in this case the kneading elements on the shaft are formed by disk elements with kneading bars mounted on them.

Multishaft mixing and kneading machines are described in CH-A 506 322, in EP 0 517 068 B, in DE 199 40 521 A1, or in DE 101 60 535. In these cases, for example, radial disk elements are located on a horizontally disposed shaft, and axially oriented kneading bars are located on and/or between the disks. Engaging between these disks, from the other horizontally disposed shaft, are mixing and kneading elements of framelike form. These mixing and kneading elements clean the disks and kneading bars of the first shaft. The kneading bars on both shafts in turn clean the inner housing wall. The two shafts may rotate in the same or opposite directions and at the same or different speeds.

The present invention is concerned in particular with the production of a spinning solution. There is no intention, however, for the invention to be confined to this. Cellulose is a common material for producing textile fibers from a spinning solution of this kind. The most simple mode of production is the use of pure cellulose of the kind available in nature. Cotton—which translates from German as "tree wool"—grows as a spinnable fiber in a forb plant, and, after harvesting, sorting, and washing, can be spun directly. The drawback of this method is the comparatively poor availability of cotton plants. These plants also grow only in particular climatic zones, and require intensive watering. Only a small part of the plants is effectively spinnable.

Cellulose is present virtually in all plants, especially in wood. This cellulose has to be purified, with a need in particular to remove hemicellulose and lignin. Unlike cotton, this purified cellulose is not spinnable. It is therefore dissolved in a suitable solvent and extruded through a die. Following emergence of the die, the cellulose is precipitated by washing off the solvent. This produces a fiber of defined diameter, according to the diameter of the spinneret die. This process is called solution spinning. As solvents there are various alternatives. The most widespread is dissolution in xanthate. The product of that process is customarily called viscose, or else rayon in English-speaking countries. Cellulose, physically, is very difficult to dissolve. The viscose process is more of a semi-chemical process, since the cellulose molecules enter into a temporary bond with the xanthate. Another old chemical process is that of acetylation, in which the end product, however, is not cellulose, but rather cellulose acetate.

The xanthate process is highly controversial, resulting in considerable adverse effects on the environment. These adverse effects are only manageable through costly and inconvenient waste-air and wastewater reprocessing techniques. As early as half a century ago, therefore, attempts were made to develop alternatives to this process. The most significant among such processes, and one which is already utilized commercially, is that of dissolution in NMMO as solvent. The product of this process is also called "lyocell".

With the NMMO process, the purified cellulose is supplied on rolls or in bales and shredded. This cellulose is then swollen with water and various additives. Certain manufacturers do not perform this swelling step. The wet or dry cellulose is then added to a mixture of NMMO and water (NMMO is readily soluble in water). In the case of dry cellulose, the required water content is higher, since in that case the swelling has to take place in the water, cellulose, and NMMO mixture. After mixing, the suspension is gently heated and part of the water is removed under reduced pressure in a vessel with a rotating shaft. Under these circumstances, the cellulose is then soluble in the water/NMMO. The required solids content can be determined fairly reliably by way of the product temperature, since the mixture is close to the thermodynamic equilibrium. It should be borne in mind that this is a ternary mixture, with a boiling point dependent, therefore, not only on the water content but also the ratio of NMMO to cellulose. This ratio is adjusted by the initial mass of the feed, since NMMO and cellulose are both nonvolatile. Customary dissolution equipment used here includes horizontal kneaders or vertical thin-film evaporators with a rotating shaft for the mechanical mixing.

In the conventional process, the ratio of NMMO to cellulose is set such that the resultant solution after the dissolving operation is directly spinnable. It has emerged, however, that there are drawbacks to this process. First of all, the evaporation of water is higher when the water content is higher. Our own measurements have confirmed that the boiling point of the mixture goes up as the water content falls. Accordingly, in the course of the dissolving operation, there is less and less driving gradient for the heat transport of the heating walls. Additionally, there is also a considerable reduction in the heat transfer coefficient as the water content falls. Proposals have therefore been made to admix only a portion of the NMMO to the cellulose, and to admix the rest after the dissolving operation has taken place—in that case, the NMMO which is added at the end can be evaporated separately.

This new process is more economic, since the equipment for the dissolving operation can be smaller and/or higher throughputs can be achieved. One drawback of this procedure, however, is that there is a sharp rise in the viscosity of the solution in the dissolving operation. This has the advantage that mechanical energy input is now also possible, but the drawback that the energy is kneaded in very much more quickly in the viscous range. The user must therefore alternatively 1. Carry out counter-control via the rotary speed, 2. Carry out cooling in the dissolving range, or 3. Shorten the residence time in the mixing zone. In the former case, the output of the dissolver is reduced and mixing is impaired; in case 2., the mixing is impaired, and in case 3. The energy yield is impaired.

Another drawback of this process is that the torque load on the shaft is only local. The dissolution equipment must therefore be given a highly robust construction, including that part of the dissolver where low mechanical loading prevails in continuous operation. If this is not done, there is mechanical damage during the start-up or run-down of the operation or if the operator gives incorrect control orders, if there is fluctuating product quality in the feed, etc. The high local load is also a safety problem. Above particular product temperatures, the NMMO/water/cellulose mixture is highly explosive. Where the torque is locally high, the risk of temperature spikes is greater.

From the prior art it is general knowledge that a mixture is monitored for the alteration of its viscosity. This is known, for example, from U.S. Pat. No. 7,331,703 B1 for ink printers. The monitoring takes place on the basis of the change in the rotary speed of a motor spindle.

Known from US 2006/193197 A1 is a kneader-mixer in which backmixing takes place within the product chamber until the product has reached a predetermined viscosity. This product viscosity is determined overall in the product chamber by measurement of the torque of the drive.

Known from WO 2014/023738 A2, furthermore, is the monitoring of kneading elements distributed over the length of the kneader-mixer. This is applicable in particular to monitoring for breakage or deformation. For this purpose it is also possible, for example, for a torque sensor to be provided that determines those forces acting on the kneading element.

Known from DE 10 2010 014 298 A1 is a method for producing formed articles, more particularly lyocell fibers, in which a base substance for preparing a forming solution is mixed with a solvent and then this solvent is at least partly removed from the mixture and the forming solution is supplied to a means for forming. Accordingly, the forming solution is diluted prior to the forming operation; in other words, the viscosity of the forming solution is influenced.

A problem addressed by the present invention is that of carrying out a process of the abovementioned kind in a substantially more controlled way.

SUMMARY OF THE INVENTION

The foregoing problem is solved by the features of the present invention as described hereinbelow.

As mentioned above, the method of the invention relates to the treatment of any mixture, with mixture encompassing anything consisting of more than one constituent. In general, one constituent is solid and one constituent is not solid.

In the case of the method proposed here, for example, relative to the treatment of a spinning solution, the local load on the shaft is optimized by controlled metering of fresh NMMO solution within the dissolution window of the dissolving equipment. At the same time, the additional quantity of water in the NMMO feed serves for temperature control, since it evaporates and thus provides cooling. The metering points for the additional NMMO are provided only in the rear part of the dissolving equipment, as close as possible over the length, the convention being that in the front part the cellulose is metered with a very low NMMO load and at the rear the solution is discharged. The local torque loading is measured on the shaft or on static internals by way of flexural loads, and is back-calculated or computed from the temperature profile and the mass balance, on the basis of a separately measured viscosity.

In one particular embodiment of this method, the ratio of cellulose to NMMO in the feed solution is maximized, and hence the amount of water minimized before the cellulose begins to dissolve. As a further embodiment of the method, the amount of NMMO metered over the length of the dissolving equipment is only that required to optimize the torque function, and the remainder, that needed to produce the requisite spinning solution, is added after the dissolving step. Furthermore, the product temperature is controlled via the metered amount of the NMMO over the length. The mixing time can be extended without the solution being overheated by shearing.

Proposed in accordance with the invention is a method for treating a mixture in a single-shaft or multishaft mixer, the mixture comprising at least one volatile and at least one nonvolatile solvent and also one solid or liquid nonvolatile substrate. Here, in accordance with the invention, there is at least partial evaporation of the at least one volatile solvent, and so the substrate dissolves in the remaining solvent or solvent mixture. Furthermore, a solvent or solvent mixture is metered in over a length of a product chamber, in order to reduce viscosity of the mixture or solution and to increase evaporative output.

A mixer for performing the method of the invention is, for example, a kneader-mixer. The components to be processed in the case of the treatment of a spinning solution are, for example, water as volatile solvent, NMMO (N-methylmorpholine N-oxide, also "NMO") as nonvolatile solvent, and cellulose as substrate. The solvent metered in over the length of the product chamber is, for example, NMMO or a mixture of NMMO and water.

According to one preferred working example, the temperature of the solution and/or mixture is controlled through the amount of solvent metered in.

According to a further working example, the viscosity of the solution or mixture is determined by determining the mechanical load on the shaft of the mixer or on the static internals in a product chamber.

According to a further working example, the viscosity of the solution or mixture is computed by measuring the product temperature or mixture temperature and by back-calculating from the boiling point and the known viscosity for a different composition of the solution or mixture.

BRIEF DESCRIPTION OF THE DRAWINGS

Further advantages, features, and details of the invention will become apparent from the description below of preferred working examples, and also from the drawing, in which.

DETAILED DESCRIPTION

Figure 1:
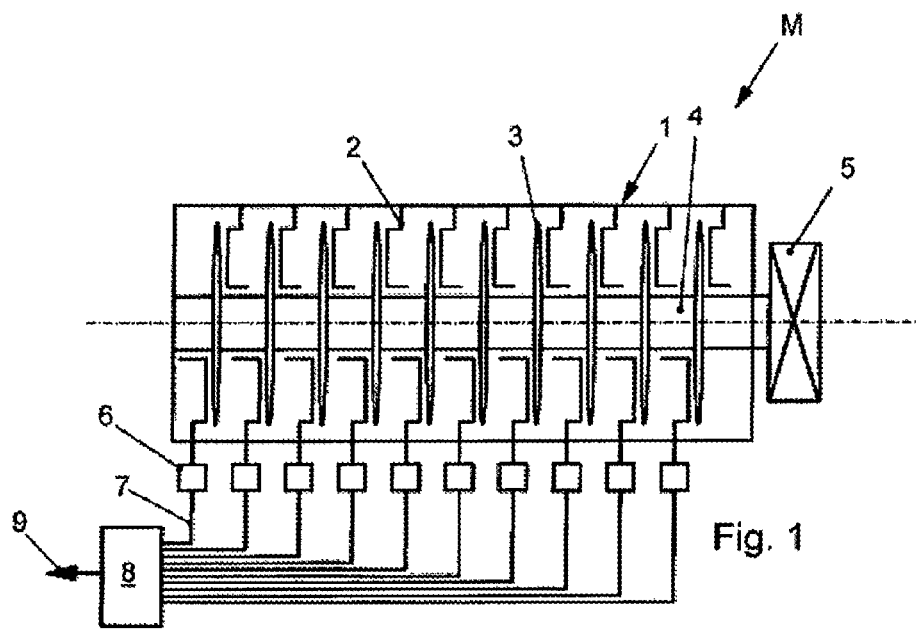
FIG. 1 shows a diagrammatically represented plan view of an apparatus of the invention for treating viscous-paste like compositions.

FIG. 1 shows a housing 1 of a kneader-mixer M, as shown more clearly in, for example, DE 43 03 852 A1 and in other specifications shown in the prior art. Located within this housing 1 are kneading elements 2, which have a C-shaped design and are directed radially inward. The kneading elements 2 cooperate with further kneading elements 3 in disk form, which are arranged on a shaft 4. Assigned to this shaft 4 is a drive 5.

For a series of kneading elements 2 there is indicated, furthermore, one valve block 6 in each case, being connected via a line 7 to a monitoring means 8. As indicated by the arrow 9, this monitoring means 8 may be connected in turn to a central control means.

Figure 2:
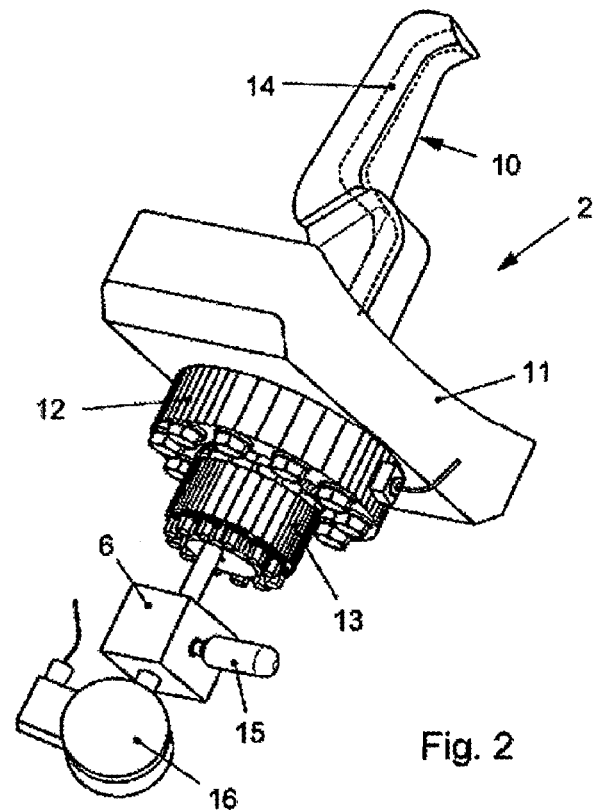
FIG. 2 shows a perspective view of a kneading element of the invention with monitoring elements.

The kneading element 2 according to FIG. 2 consists essentially of a kneading body 10 which is seated on a housing flange 11. The element is connected, furthermore, to a torque sensor 12, which is assigned a tensioning means 13.

Located in the kneading body 10, indicated by dashed lines, is at least one channel 14, which is in operative connection with the valve block 6 downstream of the tensioning means 13. This channel 14 can be subjected to a pressure means through a pressure medium from a gas cylinder 15. The pressure in the channel 14 is monitored via a pressure meter 16, more particularly a manometer.

The mode of function of the present invention is as follows:

Located in the housing 1, preferably, are a plurality of kneading elements 2, as shown in FIG. 2. The kneading body 10 itself protrudes into the interior of the housing and is connected through the housing, by means of the housing flange 11, with the torque sensor 12 located outside the housing, the tensioning means 13, the valve block 6, and the gas cylinder or manometer. A pressure is maintained in the channel 14 by way of the gas cylinder 15. In the event of damage to the kneading body 10, the pressurized gas escapes through a possible crack into the interior of the housing, thereby reducing the pressure in the channel 14. This is determined by the manometer 16, which delivers a signal to the monitoring means 8. Here, of course, it is also possible to specify a particular limit, with the pressure switch responding only under said limit. Moreover, the filling volume selected, which is monitored, is to be extremely small, so as to ensure rapid sensitive monitoring.

It is then possible, above the corresponding line 7, to identify the kneading element 2 which is possibly showing damage. The damaged kneading element can then be removed and neutralized, while the plant continues to be in operation. The kneader-mixer is operated further in an entirely normal way, specifically without shutdown.

If there is also a temperature sensor connected to the kneading body, the temperature, particularly in the composition under treatment, can be ascertained. This temperature then serves for selective control of the treatment temperature regime.

It is also possible for there to be unwanted deformation of the kneading element without cracking. Here, in accordance with the invention, provision is made for the deformation to be determined via corresponding strain gauges and/or else via the torque sensor 12, and for any damaged kneading element to be replaced.

An essential advantage of the monitoring of the kneading elements for deformation by means of a torque sensor, for example, is that now it is also possible to monitor the viscosity of the product for treatment in the kneading apparatus, at a particular point in the product chamber, along the shaft. Before now, the overall viscosity in the kneading apparatus has been monitored by monitoring of the torque of the drive for the shaft. If, however, each individual kneading element or predetermined kneading elements along the length of the kneading apparatus are monitored, the viscosity can be determined in individual zones of the kneading apparatus between input and discharge. This is a significant advantage of the present invention.

Another concept involves using the kneading elements designed in this way to feed, into the housing 1, agents which are supposed to be used for treating the viscous-paste-like composition.

Figure 3:
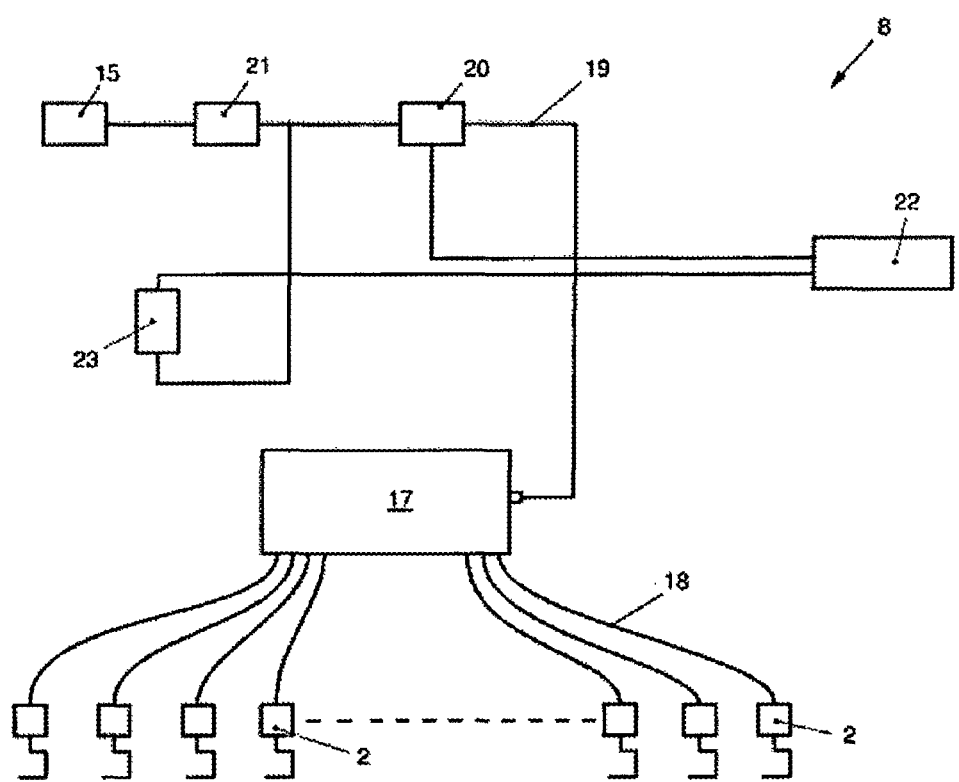
FIG. 3 shows a block-diagram representation of a working example of a monitoring means.

One working example of a monitoring means 8 of the invention is shown in more detail in FIG. 3. Here, the kneading elements 2 are connected to a common valve block 17. For this purpose there is a line 18 for a pressure means in each case. The valve block 17 is followed by a pressure means line 19, into which a flow sensor 20 and a pressure reducer 21 are connected, toward the pressure source 15. The flow sensor 20 is connected to a central control device 22, as is a pressure sensor 23, which determines whether there is a pressure means present between the pressure reducer 21 and the flow sensor 20 in the pressure means line 19.

Not shown in any detail in the drawing is the fact that the control device, of course, is also connected to the pressure source connection 15 and to the valve block 17 and also to any control valves and/or sensors possibly present, in the case of the kneading elements 2.

The mode of function of this monitoring means is as follows:

The pressure source 15 is subject to a nitrogen gas at about 4 bar, at the pressure reducer 21, via the pressure means connection. As a result of the pressure reducer 21, the pressure is lowered to—for example—1 bar. The nitrogen flows through the flow sensor 20 and the pressure means line 19 into the valve block 17, where it is distributed to the individual kneading elements 2.

If there is a low flow, which shows no explosive increase, this may be attributable to normal leakage. In order to separate the two incidents and to avoid false alarm, a predetermined, preferably constant pressure is always maintained in the pressure means line 19, but the flow is monitored, especially in relation to the flow time. In the case of a normal leakage, there is a very low flow within a certain unit time. An alarm is only triggered when the flow experiences, for example, a sudden or sharp increase. This is a sign of a rupture or crack in the kneading element, and in that case an alarm is triggered.

The corresponding control signal is in that case utilized, for example, to shut off the drive to the shaft of a kneader-mixer, or to shut down, engage or otherwise influence input and discharge members for reactant or product in or from a compartment of the kneading apparatus, or else in order to shut down or influence the heating of the kneading-apparatus compartment and/or of the kneading elements.

The invention claimed is:

1. A method for treating a mixture in a single-shaft or multishaft mixer (M) for preparing a spinning solution, comprising metering a solvent or solvent mixture into a product over a length of a product chamber in order to reduce viscosity of the solvent or solvent mixture and to increase evaporative output, and determining the viscosity of the solution or mixture at predetermined locations along a shaft in the product chamber.

2. The method as claimed in claim 1, including modifying the viscosity of the solution or mixture at the predetermined locations in the product chamber.

3. The method as claimed in claim 1, wherein the determining step is carried out by measurement of a mechanical load on static and/or dynamic internals (2) in the product chamber.

4. The method as claimed in claim 3, including computing the viscosity of the solution or mixture by measurement of the product temperature and calculation back from a boiling point and a known viscosity for a different composition of the solution.

5. The method as claimed in claim 4, including controlling the temperature of the mixture or solution by controlling the quantity of solvent or solvent mixture which is metered.

6. The method as claimed in claim 1, wherein the viscosity is determined on the basis of a torque of the shaft (4) and/or of the static and/or dynamic internals (2).

7. The method as claimed in claim 1, wherein the viscosity is determined using deformation of the static and/or dynamic internals (2).

8. The method as claimed in claim 1, wherein the solvent mixture comprises at least one volatile and at least one nonvolatile solvent and a solid or liquid nonvolatile substrate, where the substrate dissolves in the solvent or solvent mixture as a result of at least partial evaporation of the at least one volatile solvent.

* * * * *